US012415103B1

(12) United States Patent
Roseveare, Jr.

(10) Patent No.: US 12,415,103 B1
(45) Date of Patent: Sep. 16, 2025

(54) FALL PROTECTION ANCHOR DEVICES, SYSTEMS, AND METHODS

(71) Applicant: Ronald N. Roseveare, Jr., Lynchburg, VA (US)

(72) Inventor: Ronald N. Roseveare, Jr., Lynchburg, VA (US)

( * ) Notice: Subject to any disclaimer, the term of this patent is extended or adjusted under 35 U.S.C. 154(b) by 0 days.

(21) Appl. No.: 19/070,861

(22) Filed: Mar. 5, 2025

Related U.S. Application Data

(60) Provisional application No. 63/637,996, filed on Apr. 24, 2024.

(51) Int. Cl.
*A62B 35/00* (2006.01)
*E04G 21/32* (2006.01)

(52) U.S. Cl.
CPC ...... *A62B 35/0068* (2013.01); *A62B 35/0043* (2013.01); *E04G 21/3276* (2013.01); *E04G 21/328* (2013.01); *E04G 21/3285* (2013.01)

(58) Field of Classification Search
CPC ............ A62B 35/0043; A62B 35/0068; E04G 21/328; E04G 21/3285; E04G 21/3276
See application file for complete search history.

(56) References Cited

U.S. PATENT DOCUMENTS 3,423,898 A 1/1969 Tracy
4,249,713 A 2/1981 Glynn
4,261,155 A * 4/1981 Gilb ...................... E04B 1/2612 248/282.1
5,137,112 A 8/1992 Nichols
5,287,944 A 2/1994 Woodyard
5,346,036 A 9/1994 Arisman
5,361,558 A 11/1994 Thornton
5,370,202 A 12/1994 Nichols
5,553,685 A 9/1996 Cook
5,595,260 A 1/1997 Jalla
5,727,646 A 3/1998 Gray
5,730,407 A 3/1998 Ostrobrod
6,098,746 A 8/2000 Castaneda
6,668,509 B1 12/2003 Krebs
6,763,910 B2 7/2004 Cole
6,966,531 B2 11/2005 Curtin
7,380,373 B2 6/2008 Crookston
7,665,248 B2 * 2/2010 Blackford ............... E04G 5/041 52/27
8,448,745 B2 5/2013 Crookston
9,003,715 B2 4/2015 Nurdogan
9,238,915 B2 1/2016 Roseveare
9,951,557 B2 4/2018 Roseveare
10,053,878 B2 8/2018 Allen
10,718,125 B2 7/2020 Lopez
11,118,363 B1 9/2021 Allen
11,203,881 B2 12/2021 Meinhold
11,554,277 B2 * 1/2023 Fabbi ..................... A62B 35/04
11,724,135 B2 8/2023 Nichols
12,123,208 B1 10/2024 King (Continued)

*Primary Examiner* — Eret C McNichols
(74) *Attorney, Agent, or Firm* — Michael Haynes PLC; Michael N. Haynes

(57) ABSTRACT

Certain exemplary embodiments can provide a system, machine, device, and/or manufacture that is adapted for and/or resulting from, and/or a method for, activities that can comprise and/or relate to, preventing falls from a double-section steep pitch roof, the roof defining two substantially planar steep pitch roof portions that meet at a ridge of the roof.

10 Claims, 7 Drawing Sheets

(56) References Cited

U.S. PATENT DOCUMENTS

| | | | | |
|---|---|---|---|---|
| 2003/0051429 | A1 | 3/2003 | Hovenier | |
| 2006/0059844 | A1 | 3/2006 | Ely | |
| 2006/0260260 | A1 | 11/2006 | Blackford | |
| 2008/0271407 | A1 | 11/2008 | Snider | |
| 2011/0314769 | A1 | 12/2011 | Foster | |
| 2012/0031700 | A1 | 2/2012 | Nichols | |
| 2012/0222370 | A1 | 9/2012 | Crookston | |
| 2013/0185906 | A1 | 7/2013 | Nichols | |
| 2014/0123568 | A1* | 5/2014 | Nurdogan | E04D 13/12<br>52/173.1 |
| 2014/0346312 | A1 | 11/2014 | Small | |
| 2015/0075107 | A1 | 3/2015 | Wert | |
| 2015/0107184 | A1 | 4/2015 | Nichols | |
| 2017/0268243 | A1 | 9/2017 | Lopez | |
| 2021/0115686 | A1 | 4/2021 | Meinhold | |
| 2024/0102302 | A1 | 3/2024 | Voss | |
| 2025/0052080 | A1* | 2/2025 | Meinhold | E04G 21/3295 |

* cited by examiner

FALL PROTECTION ANCHOR DEVICES, SYSTEMS, AND METHODS

CROSS-REFERENCES TO RELATED APPLICATIONS

This application claims priority to, and incorporates by reference herein in its entirety, U.S. Provisional Patent Application 63/637,996, filed 24 Apr. 2024.

BRIEF DESCRIPTION OF THE DRAWINGS

A wide variety of potential, feasible, and/or useful embodiments will be more readily understood through the herein-provided, non-limiting, non-exhaustive description of certain exemplary embodiments, with reference to the accompanying exemplary drawings in which.

Figure 1:
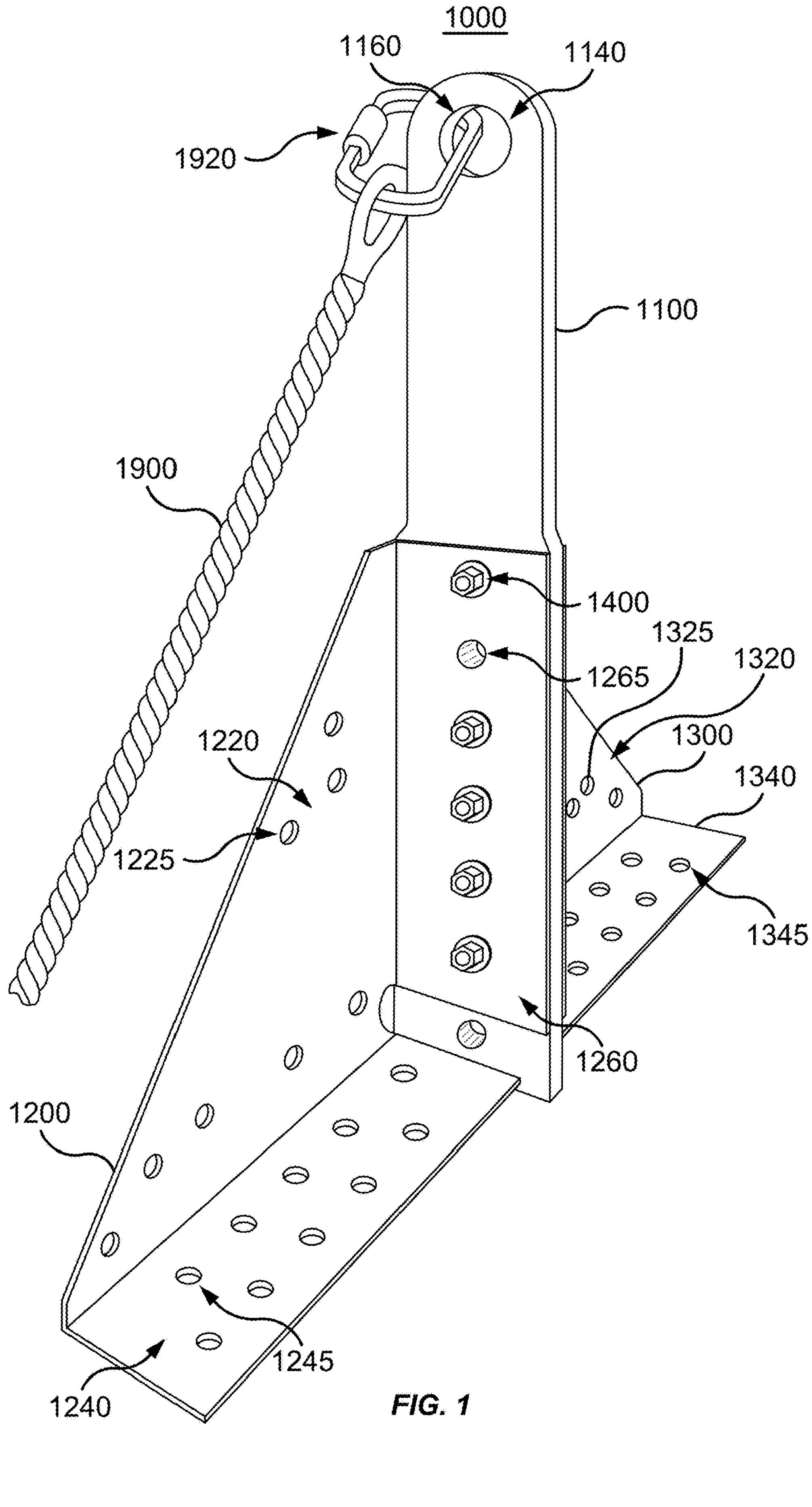
FIG. 1 is a perspective view of an exemplary embodiment of system 1000.
Figure 2:
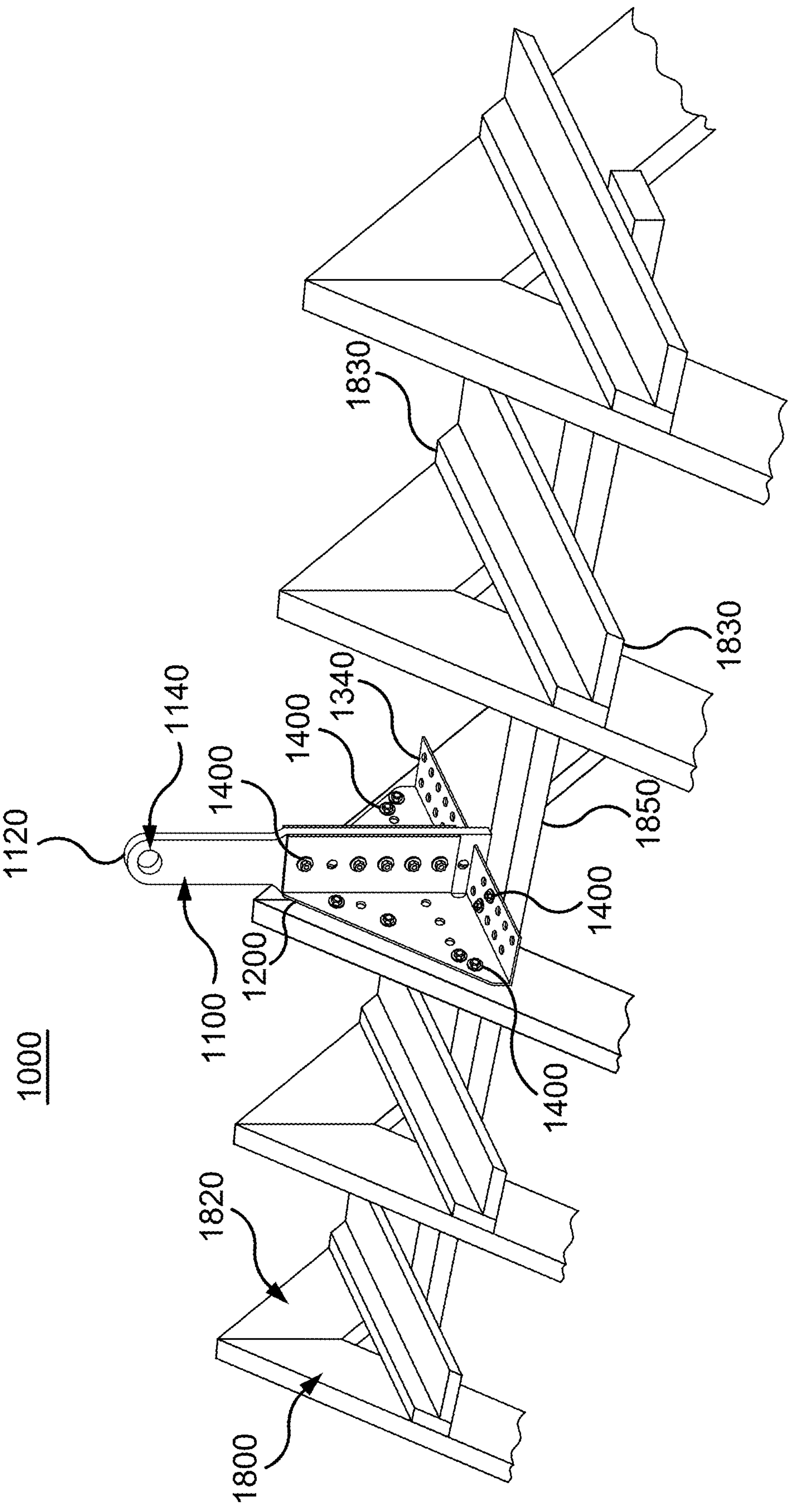
FIG. 2 is a perspective view of an exemplary embodiment of an installed system 1000.
Figure 3:
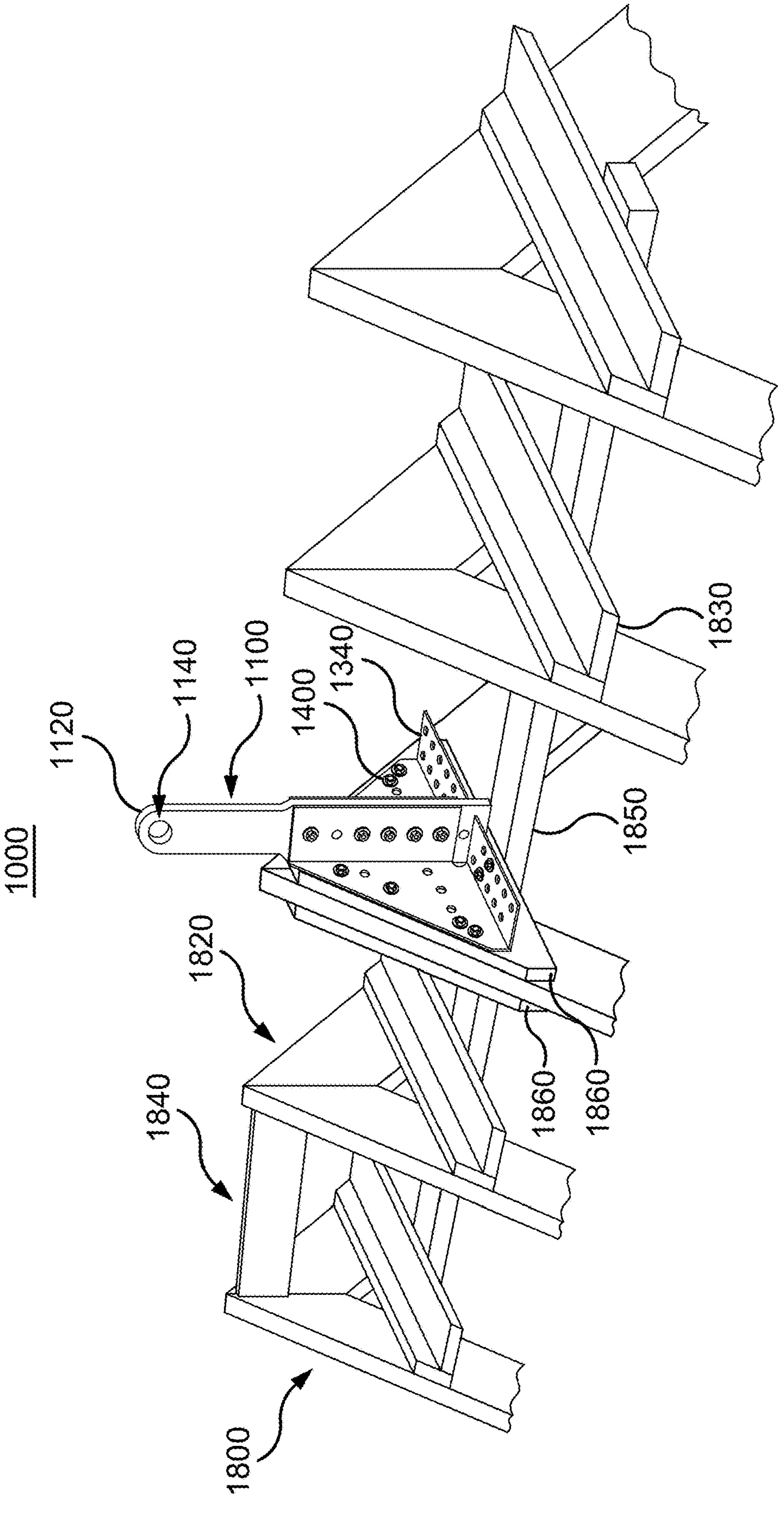
FIG. 3 is a perspective view of an exemplary embodiment of an installed system 1000.
Figure 4:
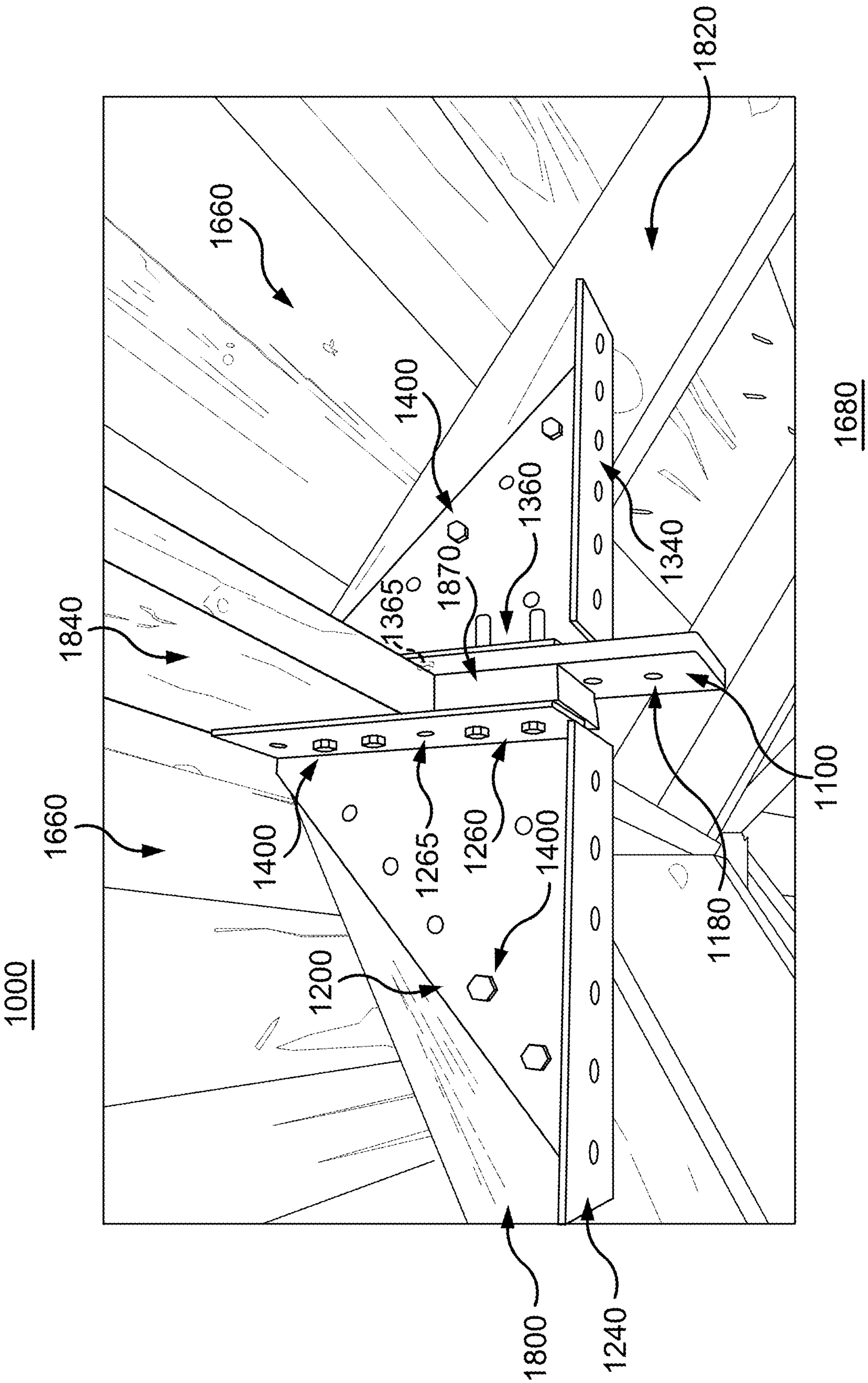
FIG. 4 is a perspective view of an exemplary embodiment of an installed system 1000.

The following table links each numbered drawing element to its name:

| Number | Name |
|---|---|
| 1000 | Fall protection anchor system |
| 1100 | Anchor bar |
| 1120 | Anchor bar terminus |
| 1140 | Anchor point aperture |
| 1160 | Anchor point |
| 1180 | Anchor bar apertures |
| 1200 | Anchor bracket |
| 1220 | Anchor bracket plate |
| 1225 | Anchor bracket plate apertures |
| 1240 | Anchor bracket horizontal flange |
| 1245 | Anchor bracket horizontal flange apertures |
| 1260 | Anchor bracket vertical flange |
| 1265 | Anchor bracket vertical flange apertures |
| 1300 | Anchor bracket |
| 1320 | Anchor bracket plate |
| 1325 | Anchor bracket plate apertures |
| 1340 | Anchor bracket horizontal flange |
| 1345 | Anchor bracket horizontal flange apertures |
| 1360 | Anchor bracket vertical flange |
| 1365 | Anchor bracket vertical flange apertures |
| 1400 | Fasteners |
| 1600 | Roof |
| 1620 | Roof portion |
| 1630 | Roof portion |
| 1640 | Ridge |
| 1650 | Roof covering |
| 1660 | Roof decking |
| 1680 | Attic |
| 1800 | Rafter |
| 1820 | Rafter |
| 1830 | Tie |
| 1840 | Ridge board |
| 1850 | Purlin |
| 1860 | Gusset |
| 1900 | Fall protection system |
| 1920 | Fall protection system connector |

DESCRIPTION

In the realm of architecture and building construction, including housing design and construction, a roofing system that defines a peaked roof can comprise a roof framing system. A roof framing system can comprise a plurality of rafters, which can be common rafters or can be the top chords in a truss. A roof framing system often serves as the primary structural component of a peaked roof, providing support for certain components of the roofing system, such as the roof decking (or sheathing), underlayment, and covering materials such as shingles, tiles, slate, shakes, and/or metal panels.

In a roofing system that defines a typical double-section peaked roof, two intersecting roof portions are supported by a roof framing system that usually comprises a series of substantially evenly spaced, substantially parallel framing units, each framing unit typically comprising a pair of rafters (e.g., common rafters or top chords of a truss).

Each rafter in a pair is a sloped beam, which is commonly made of timber, lumber, wood composite, steel, and/or aluminum, that extends from the roof's ridge (i.e., peak) region at its upper edge down to the roof's gutter region at the rafter's lowest point. Rafters not only define the roof's shape but also determine its pitch or slope, which is necessary for effective water drainage. Additionally, rafters bear the roof's weight and transfer it to supporting structures (e.g., walls), while also serving as a framework for attaching the roof decking. Along with other components of the roofing system, such as collar ties, strongbacks, ridge boards, webs, bottom chords (tie beams), posts, purlins, struts, braces, joints, gussets, ceiling joists, nailplates, and/or connection plates, rafters contribute to the structural integrity and stability of the roofing system.

Certain exemplary buildings can have a roof that can be considered to be a "steep pitch roof", i.e., a roof that has a vertical rise of 4 or more inches over a horizontal distance of 12 inches. Steep pitch roofs can require access for workers to perform inspection, installation, maintenance, and/or repairs, such as for the installation, inspection, cleaning, maintenance, repair, removal, and/or replacement of, e.g., a roof covering, gutter, chimney, vent, skylight, solar panel, lightbulb, and/or antenna.

To help workers performing such work to minimize their risk of falls, certain exemplary embodiments can provide a fall protection anchor system that can be installed at the ridge of a roof and/or in such a manner that a worker can use the fall protection anchor system safely in any direction. Certain exemplary embodiments can be suitable for use with most roofing systems, roof materials, construction designs, and/or fall protection systems.

As partially shown in Images 1 and/or 2 of the incorporated provisional application, certain exemplary fall protection systems 1900 can include a harness to be worn by the worker, a load limiting lanyard (which can include a fall arrestor) connected to the harness, and a rope connected to the lanyard (or directly to the harness if no lanyard is used).

As shown in FIGS. 1-5, certain exemplary fall protection systems 1900 can be attached to certain exemplary fall protection anchor systems 1000, such as at an anchor point 1160, which can be defined by the fall protection anchor system 1000 and/or be located at or near the ridge 1640 of a roof 1600.

Certain exemplary fall protection anchor systems 1000 can comprise an elongate anchor bar 1100, which can operatively extend substantially vertically, defining near an anchor bar upper terminus 1120 (which can be rounded) an anchor point aperture 1140, which can be substantially circular or oval in cross-sectional shape. Anchor point aperture 1140 can operatively receive a fall protection system connector 1920 (e.g., carabiner, hook, and/or rope) of a fall protection system 1900, thereby defining an anchor point 1160 at the contact between connector 1920 and anchor bar 1100.

Anchor bar 1100 can define a plurality of anchor bar apertures 1180, which can extend through a thickness of anchor bar 1100, can be substantially equally spaced along a portion of a length of anchor bar 1100 and/or be substantially centered within a width of anchor bar 1100.

In an operative configuration, anchor bar terminus 1120 can be installed above roof covering 1660, such as near ridge 1640, while most or even all anchor bar apertures 1180 are positioned within attic 1600, which can be covered by and/or partially defined by roof 1600 and/or roof decking 1660.

Figure 6A:
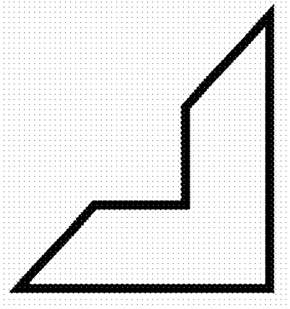
FIGS. 6A through 6O are front views of exemplary embodiments of anchor bracket plates.
Figure 6B:
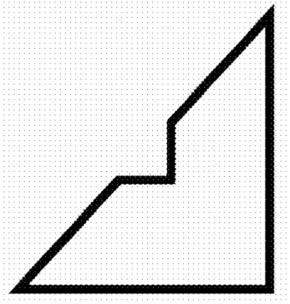
Figure 6C:
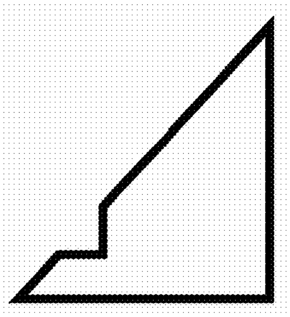
Figure 6D:
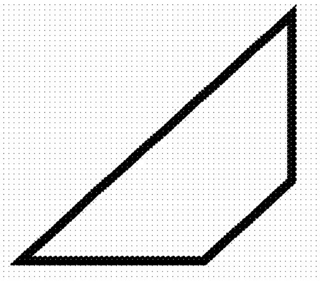
Figure 6E:
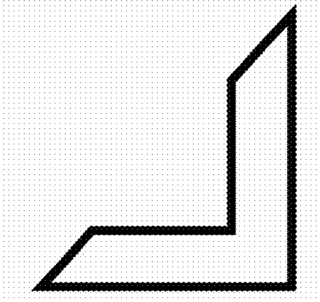
Figure 6F:
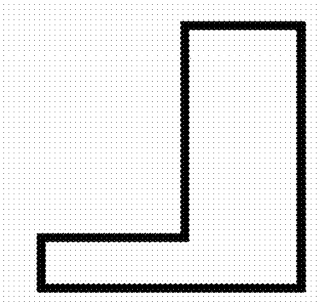
Figure 6G:
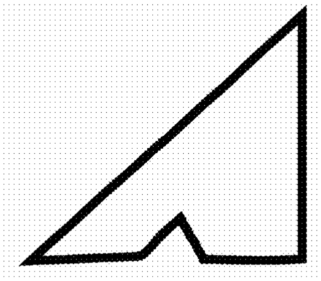
Figure 6H:
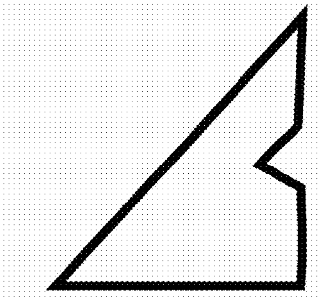
Figure 6I:
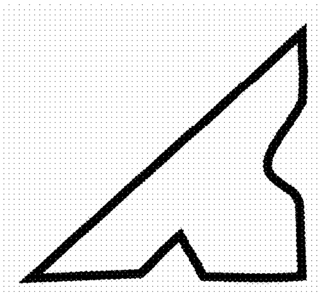
Figure 6J:
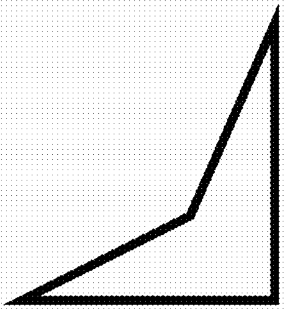
Figure 6K:
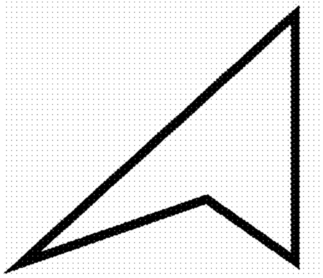
Figure 6L:
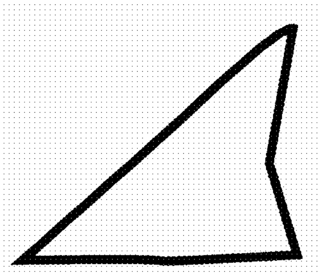
Figure 6M:
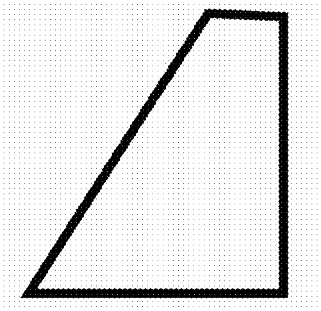
Figure 6N:
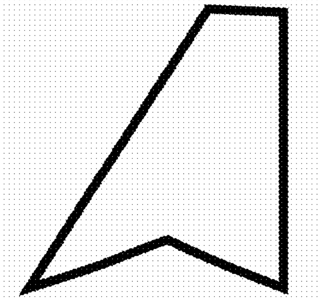
Figure 6O:
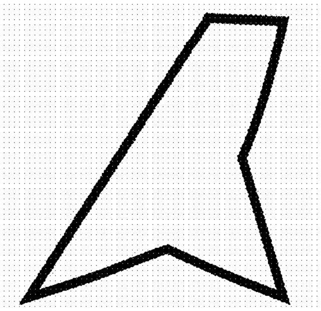

Fall protection anchor system 1000 can comprise an anchor bracket 1200, which can define a substantially planar, polygonal, anchor bracket plate 1220, which can have a shape such as shown in FIGS. 6A through 6O, or any other closed polygonal shape. Likewise, fall protection anchor system 1000 can comprise an anchor bracket 1300, which can define a substantially planar, polygonal, anchor bracket plate 1320, which can have a shape such as shown in FIGS. 6A through 6O, or any other closed polygonal shape.

A plurality of anchor bracket plate apertures 1225 can extend through anchor bracket plate 1220. Anchor bracket plate apertures 1225 can be uniformly or non-uniformly shaped and/or can be regularly or irregularly spaced on anchor bracket plate 1220. A plurality of anchor bracket plate apertures 1325 can extend through anchor bracket plate 1320. Anchor bracket plate apertures 1325 can be uniformly or non-uniformly shaped and/or can be regularly or irregularly spaced on anchor bracket plate 1320.

Integral to, and extending substantially perpendicular to, anchor bracket plate 1220 can be a substantially planar, bar-like, anchor bracket horizontal flange 1240, through which a plurality of anchor bracket horizontal flange apertures 1245 can extend. Likewise, integral to, and extending substantially perpendicular to, anchor bracket plate 1220 can be a substantially planar, bar-like, anchor bracket vertical flange 1260, through which a plurality of anchor bracket vertical flange apertures 1265 can extend. In this context, "horizontal" and "vertical" refer to the operative directions that each flange extends.

Anchor bracket horizontal flange apertures 1245 can be uniformly or non-uniformly shaped and/or can be regularly or irregularly spaced on anchor bracket horizontal flange 1240. Likewise, anchor bracket horizontal flange apertures 1345 can be uniformly or non-uniformly shaped and/or can be regularly or irregularly spaced on anchor bracket horizontal flange 1340. In certain exemplary embodiments, anchor bracket horizontal flange apertures 1245 and/or anchor bracket horizontal flange apertures 1345 can be arranged in rows, which can be of equal or unequal length and/or can present their anchor bracket horizontal flange apertures 1245 and/or anchor bracket horizontal flange apertures 1345 as offset from one row to the next.

Anchor bracket vertical flange apertures 1265 can be uniformly or non-uniformly shaped and/or can be regularly or irregularly spaced on anchor bracket vertical flange 1260. Likewise, anchor bracket vertical flange apertures 1365 can be uniformly or non-uniformly shaped and/or can be regularly or irregularly spaced on anchor bracket vertical flange 1360. In certain exemplary embodiments, anchor bracket vertical flange apertures 1265 and/or anchor bracket vertical flange apertures 1365 can be arranged in columns, which can be of equal or unequal length and/or can present their anchor bracket vertical flange apertures 1265 and/or anchor bracket vertical flange apertures 1365 as offset from one column to the next.

A plurality of anchor bracket plate apertures 1325 can extend through anchor bracket plate 1320. Integral to, and extending substantially perpendicular to, anchor bracket plate 1320 can be a substantially planar, bar-like, anchor bracket horizontal flange 1340, through which a plurality of anchor bracket horizontal flange apertures 1345 can extend. Likewise, integral to, and extending substantially perpendicular to, anchor bracket plate 1320 can be a substantially planar, bar-like, anchor bracket vertical flange 1360, through which a plurality of anchor bracket vertical flange apertures 1365 can extend. In this context, "horizontal" and "vertical" refer to the operative directions that each flange extends.

Within attic 1680, a pair of anchor brackets 1200, 1300 can be attached to one another, and to anchor bar 1100, by fasteners 1400 that can extend through anchor bracket vertical flange apertures 1265, 1365 and through anchor bar apertures 1180. For any given pair of anchor brackets 1200, 1300, when operatively installed, anchor bracket 1200 can optically mirror the general shape, structure, and/or orientation of anchor bracket 1300, where the imaginary optical mirror extends in a substantially vertical plane.

Anchor bracket 1200 can be attached to rafter 1800 and/or gusset 1860 via fasteners 1400 that can extend through anchor bracket plate apertures 1225 and/or through rafter 1800 and/or gusset 1860. Anchor bracket 1300 can be attached to rafter 1800 and/or gusset 1860 via fasteners 1400 that can extend through anchor bracket plate apertures 1325 and/or through rafter 1800 and/or gusset 1860.

Anchor bracket 1200 can be attached to tie 1830 and/or purlin 1850 via fasteners 1400 that can extend through anchor bracket horizontal flange apertures 1225 and/or through rafter 1800 and/or gusset 1860. Anchor bracket 1300 can be attached to tie 1830 and/or purlin 1850 via fasteners 1400 that can extend through anchor bracket horizontal flange apertures 1325 and/or through rafter 1800 and/or gusset 1860.

Anchor bracket 1200 can be attached to ridge board 1840 via fasteners 1400 that can extend through anchor bracket vertical flange apertures 1265 and/or through rafter 1800 and/or gusset 1860.

Due to the arrangement of anchor bracket vertical flange apertures 1265, 1365 and anchor bar apertures 1180, the height that anchor bar terminus 1120 can extend above roof 1600 and/or ridge 1640 can be adjustable, even after anchor brackets 1200, 1300 have been fastened to rafters 1800, 1820, tie 1830, purlin 1850, blocking (not shown), bracing (not shown), and/or gusset 1860 (to the extent any of those structural members are present and/or help support a given roof 1600).

To adjust the operative height of anchor bar 1100 above roof 1600 and/or ridge 1640, one need only remove those fasteners 1400 that fasten, attach, and/or connect anchor bar 1100 to anchor bracket 1200, anchor bracket 1300, and/or ridge board 1840, change the height of anchor bar 1100 above roof 1600 and/or ridge 1640, and re-install fasteners 1400 through the desired and co-aligned anchor bar apertures 1180, anchor bracket vertical flange apertures 1265, and/or anchor bracket vertical flange apertures 1365. To the extent that any such fasteners 1400 previously extended through holes in ridge board 1840, those fasteners can be extended again through the same holes, or new holes can be formed in ridge board 1840 to accommodate fasteners 1400 and the new height of anchor bar 1100 above roof 1600 and/or ridge 1640.

Anchor bar 1100, anchor bracket 1200, and/or anchor bracket 1300 can be formed from an environmentally compatible, corrosion-resistant material, such as stainless steel and/or galvanized steel. Fasteners 1400 can be, e.g., nominal ¼", ⅜", ½", and/or ⅝" diameter, grade 5 and/or grade 8, hex head bolts and/or carriage bolts, possibly accompanied by one or more corresponding nuts, flat washers, and/or lock washers, the fasteners ranging in length, as needed, from approximately 2" to approximately 6".

In an operative configuration, anchor bracket plate 1220 can have a closed polygonal shape that, and although that shape can have any number of corners, three corners of that shape can define the three vertices of at least a virtual right triangle, which can define a vertical side and a horizontal side of that triangle. The ratio of the length of the vertical side to the length of the horizontal side of the right triangle can be within a range of 0.3 to 1.7. Therefore, the hypotenuse of the right triangle can be parallel to or skewed with respect to a longitudinal axis of the rafter 1800 that corresponds to anchor bracket plate 1220.

Similarly, anchor bracket plate 1320 (which can, but need not, have a mirror image configuration to anchor bracket plate 1220) can have a closed polygonal shape that, and although that shape can have any number of corners, three corners of that shape can define the three vertices of at least a virtual right triangle, which can define a vertical side and a horizontal side of that triangle. The ratio of the length of the vertical side to the length of the horizontal side of the right triangle can be within a range of 0.3 to 1.7. Therefore, the hypotenuse of the right triangle can be parallel to or skewed with respect to a longitudinal axis of the rafter 1820 that corresponds to anchor bracket plate 1320.

Note that in certain exemplary embodiments, anchor bracket horizontal flange 1240 can be longer or shorter than anchor bracket horizontal flange 1340. Likewise, in certain exemplary embodiments, anchor bracket vertical flange 1260 can be longer or shorter than anchor bracket vertical flange 1360. Thus, in certain exemplary embodiments, the ratio of the length of the vertical side to the length of the horizontal side of the right triangle defined by anchor bracket plate 1220 can be different from the ratio of the length of the vertical side to the length of the horizontal side of the right triangle defined by anchor bracket plate 1320.

In certain exemplary embodiments, anchor bracket plate 1200 and/or 1300 can be formed from aluminum, stainless steel, or painted or plated carbon steel, can define a pitch of approximately 4/12 to approximately 20/12, can define a hypotenuse length of from approximately 12" to approximately 24", can have flange depths of approximately 3" to approximately 5", can define approximately 7 to approximately 14 holes (apertures) in their plate, horizontal flange, and/or vertical flange, those holes having diameters of approximately 13/32" to approximately 17/32", and spaced approximately ½" to 1½" apart in one, two, or three columns.

In certain exemplary embodiments, anchor bar 1100 can be approximately 15" to approximately 30" long/tall, approximately 2.75" to approximately 4" wide, and approximately ⅜" to approximately ¾" thick, have a hole count of approximately 4 to 8, spaced approximately 1" to approximately 2" apart in one or two columns, and a nominal diameter of approximately ⅜" to ½".

In certain exemplary embodiments, anchor bar 1100, anchor bracket 1200, and/or anchor bracket 1300 can be formed from aluminum and/or from Grade 304, 316, 416, 431, 630, 2205, and/or 17-4PH stainless steel, which potentially can be hardened after machining, such as to H900.

Certain exemplary embodiments of fall protection anchor system 1000 can:

- Support a 3000-pound static tensile force (e.g., load) in any direction for 5 minutes before being released, that force having a downward component, without the force causing visible deformation or damage to fall protection anchor system 1000 or any component thereof;
- Be suitable for use with many roof decking/sheathing types, such as nominal 1"×6" or 1"×8" boards, ¾" plywood, ½" thick oriented strand board (OSB);
- Be suitable for use with multiple construction framing styles such as approximately and/or nominal 2"×6" to 2"×12" common rafters, as well as the rafters (top chords) of engineered approximately and/or nominal 2"×4" roof trusses, and/or for rafters having a width from approximately 1.5" to approximately 4";
- Be vertically adjustable to provide the necessary clearance for numerous and/or practically any roof type or ridge style;
- Be suitable for use on numerous and/or all steep pitch roof types and/or materials, including: asphalt shingle, metal, cedar shake, slate, and/or tile;
- Not rely on fasteners "buried" such that they extend through the roof covering or decking/sheathing into the roof rafter;
- Be completely inspectable (including the fasteners) from the safety of the attic; and/or
- Not rely on welds and/or moving parts that potentially can fail.

Certain exemplary fall protection anchor system can be installed one time and potentially last the lifetime of the roof and/or the lifetime of the building. Once installed, such a "permanent" fall protection anchor system can be readily available for workers to simply connect into and/or onto with a carabiner or similar "hook" attached to the rope of their fall protection system.

Certain exemplary embodiments of a method for utilizing a fall protection anchor system can comprise the following activities:

- Inspect the attic and roof support system, i.e., the rafters at the desired location for the roof anchor system to be installed;
- Referring to the incorporated provisional application, select the Figure (from FIGS. 1-4) that best matches the roof support system and prepare to install the roof anchor system accordingly;
- Clamp the Anchor Brackets to the roof's common rafters or to one or more approximately ¾" plywood gussets if top chords of trusses are present at and/or adjacent the desired location, the gussets having a height of approximately 18" to approximately 30" and a pitch of approximately 4/12 to approximately 20/12;
- Provide a notch or opening in the roof sheathing and roofing material that is sized sufficiently for the anchor bar to extend from the attic to above the outdoor surface of the roofing material at the desired location;
- Select a desired height that the anchor point be located above the outdoor surface of the roofing material vertically above the roof ridge;
- Using fasteners, bolt the anchor bar to and/or through the ridge board (if present) and to and/or through both anchor bracket vertical flanges to achieve the desired height;

If the roof is supported by the rafters that comprise the top chords of roof trusses at and/or adjacent the desired location instead of common rafters, cut and install one or more plywood gussets. Install wood blocking as needed between the plywood gussets at the locations of the fasteners; and/or Bolt the anchor bracket plates to and/or through the plywood gussets (if present), and to the roof rafters. Locate the fasteners no closer than 1.75 inches from the edges of the rafters.

Figure 5:
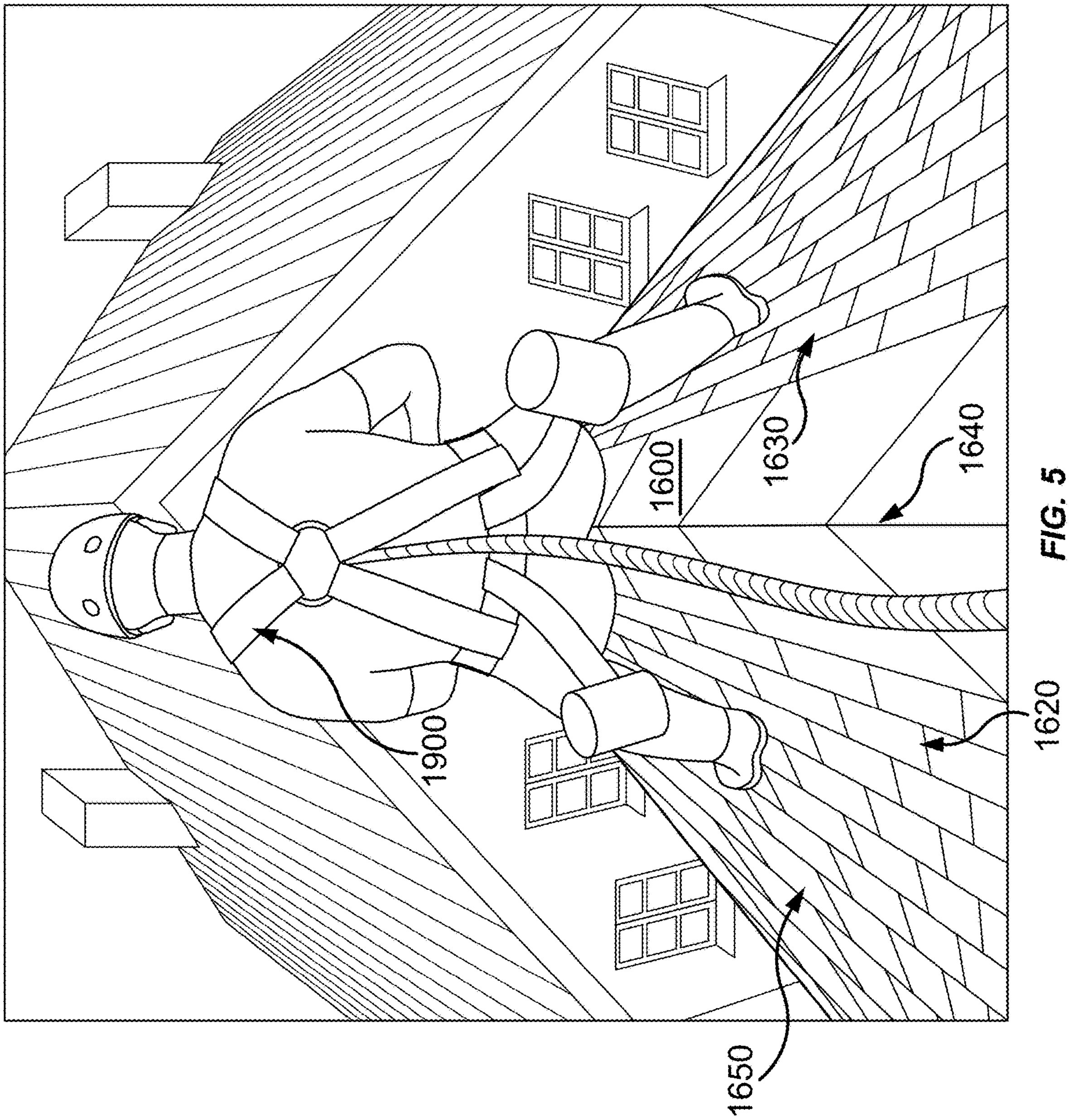
FIG. 5 is a perspective view of an exemplary embodiment of a double-section steep pitch roof.

In certain exemplary embodiments, fall protection anchor system can support the 3000-pound or 5000-pound load described above in a direction parallel to the rafter on either side of the ridge. In certain exemplary embodiments, via the addition of lateral bracing, that best matches the situation, such as shown in FIG. 5 of the incorporated provisional application, Views “A”-“A” through “E”-“E”, the fall protection anchor system can support the 3000-pound or 5000-pound load described above in every direction, including parallel to the ridge (perpendicular to the rafter) as might be used and/or needed with an engineered horizontal lifeline system.

Certain exemplary embodiments can provide:

a fall protection anchor system for a double-section steep pitch roof, the roof defining two substantially planar steep pitch roof portions that meet at a ridge of the roof, the ridge extending perpendicular to a rafter that partially supports one or more of the roof portions, each roof portion defined by a roof pitch expressed as a ratio of a vertical rise divided by a horizontal span of that roof portion, the roof pitch ranging between 4:12 and 20:12, the anchor system comprising:

an elongate anchor bar that defines an anchor point aperture extending through the anchor bar to define an anchor point operatively located above the ridge;

a pair of anchor brackets, each anchor bracket:

comprises a plate that defines a plurality of plate flanges, each plate flange extending in a corresponding plate flange plane, each plate flange plane substantially orthogonal to a plane defined by the plate, a first plate flange of the plurality of plate flanges operatively extending substantially vertically, a second plate flange of the plurality of plate flanges operatively extending substantially horizontally;

defines a plurality of bracket plate apertures extending through its plate;

defines a plurality of bracket flange apertures extending through one or more of its flanges;

operatively attaches to a roof support via a plurality of fasteners that extend through the plurality of bracket plate apertures, the roof support comprising the rafter or a gusset, blocking, or bracing attached to the rafter; and/or operatively attaches to the anchor bar; and/or wherein:

the first plate flange of a first anchor bracket of the pair of anchor brackets and the first plate flange of a second anchor bracket of the pair of anchor brackets operatively fastened to each other and to the anchor bar;

the anchor system operatively fastens the anchor bar at any of a plurality of elevations with respect to the anchor brackets after each anchor bracket is operatively attached to its roof support;

the anchor bar defines a vertically extending anchor bar height, an anchor bar width that is orthogonal to the anchor bar height, and an anchor bar thickness that is orthogonal to the anchor bar height and the anchor bar width, the anchor bar width defining a plane that is operatively substantially parallel to a plane defined by the ridge of the roof;

the anchor bar operatively extends, through an opening in the roof, from an interior attic zone covered by the roof to above the ridge of the roof;

the anchor bar operatively connects to a fall protection system at the anchor point;

when the anchor system undergoes a load test during which the anchor system operatively supports a 3000-pound static tensile force applied, to the anchor bar at the anchor point, in any direction for 5 minutes before being released, the roof support experiences no damage and the anchor bar experiences no permanent deformation;

when the anchor system undergoes a load test during which the anchor system operatively supports a 3000-pound static tensile force applied, to the anchor bar at the anchor point, in any direction for 5 minutes before being released, the roof support experiences no damage, the anchor bar experiences no permanent deformation, and, during the load test, the anchor bar experiences a deflection ratio of less than 0.5, the deflection ratio defined by the largest horizontally measured deflection of the anchor bar at the anchor point at any time during the load test divided by the anchor bar thickness at the anchor point;

the first plate flange of the first anchor bracket of the pair of anchor brackets operatively attaches to a ridge board of the roof.

the second plate flange of the first anchor bracket of the pair of anchor brackets operatively attaches to an elongate support member that longitudinally extends parallel to the ridge and connects the rafter to an adjacent rafter;

the plate defines, at least in part, a substantially right triangular shape, the shape comprising a operatively substantially vertically extending side and an operatively substantially horizontally extending side, a ratio of a length of the operatively substantially vertically extending side to a length of the operatively substantially horizontally extending side ranging from 0.333 to 1.67;

for each anchor bracket, the plate defines a pitch of that anchor bracket, the pitch of the anchor bracket operatively differing from the roof pitch;

each anchor bracket and each of its plurality of fasteners is operatively visible from an interior attic zone covered by the roof; and/or the anchor point aperture has a round and/or oval cross-sectional shape.

Certain exemplary embodiments can provide the immediately above-described fall protection anchor system and the immediately above-described fall protection system, the fall protection system comprising a lifeline and a connector that operatively connects the lifeline to the anchor bar at the anchor point.

Definitions

When the following phrases are used substantively herein, the accompanying definitions apply. These phrases and definitions are presented without prejudice, and, consistent with the application, the right to redefine these phrases via amendment during the prosecution of this application or any application claiming priority hereto is reserved. For the purpose of interpreting a claim of any patent that claims priority hereto, each definition in that patent functions as a clear and unambiguous disavowal of the subject matter outside of that definition.

a—at least one.

about—around and/or approximately.

above—at a higher level and/or elevation.

across—from one side to another.

activity—an action, act, step, and/or process or portion thereof.

adapt—to design, make, set up, arrange, shape, configure, and/or make suitable and/or fit for a specific purpose, function, use, and/or situation.

adapter—a device used to effect operative compatibility between different parts of one or more pieces of an apparatus or system.

after—following in time and/or subsequent to.

along—through, on, beside, over, in line with, and/or parallel to the length and/or direction of; and/or from one end to the other of.

an—at least one.

anchor—(v) to hold, fix, and/or secure; (n) a device adapted to hold, fix, and/or secure another.

and—in conjunction with.

and/or—either in conjunction with or in alternative to.

any—one, some, every, and/or all without specification.

aperture—an opening, hole, gap, passage, and/or slit apparatus—an appliance or device for a particular purpose.

applied—to put onto and/or to cause to come into contact with.

approximately—about and/or nearly the same as.

around—about, surrounding, and/or on substantially all sides of; and/or approximately.

as long as—if and/or since.

associate—to join, connect together, and/or relate.

at—in, on, and/or near.

at least—not less than, and possibly more than.

attach—to mechanically fasten, secure, couple, and/or join.

attic—a story or room directly below the roof of a building.

bar—a relatively long straight rigid piece of solid metallic material used as a fastener, support, barrier, or structural or mechanical member.

before—preceding in time and/or prior to.

between—in a separating interval and/or intermediate to.

blocking—a solid piece of a hard substance, such as wood, having one or more flat sides, and/or such a piece used as a construction member or as a support.

bracing—a device that steadies or holds something else erect.

bracket—a weight bearing and/or motion restraining structural component.

by—via and/or with the use and/or help of.

can—is capable of, in at least some embodiments.

cause—to bring about, provoke, precipitate, produce, elicit, be the reason for, result in, and/or effect.

composition of matter—a combination, reaction product, compound, mixture, formulation, material, and/or composite formed by a human and/or automation from two or more substances and/or elements.

comprising—including but not limited to.

conceive—to imagine, conceptualize, form, and/or develop in the mind.

configure—to design, arrange, set up, shape, and/or make suitable and/or fit for a specific purpose, function, use, and/or situation.

connect—physically join, link, couple, and/or fasten two or more entities.

connector—a device and/or system adapted to physically or logically join, link, couple, and/or fasten two or more entities.

containing—including but not limited to.

convert—to transform, adapt, and/or change.

corresponding—related, associated, accompanying, similar in purpose and/or position, conforming in every respect, and/or equivalent and/or agreeing in amount, quantity, magnitude, quality, and/or degree.

coupleable—capable of being joined, connected, and/or linked together.

coupling—linking in some fashion.

cover—to overlay, place upon and/or over, and/or immerse.

create—to bring into being.

cross-sectional—a section formed by a plane cutting through an object, usually at right angles to an axis.

damage—destruction and/or a loss in value usefulness and/or ability resulting from an action and/or event.

define—to establish the meaning, relationship, outline, form, and/or structure of; and/or to precisely and/or distinctly describe and/or specify.

deflection—a displacement of a system under load.

deformation—the result of deforming and/or a change in form especially for the worse.

derive—to receive, obtain, and/or produce from a source and/or origin.

determine—to find out, obtain, calculate, decide, deduce, ascertain, and/or come to a decision, typically by investigation, reasoning, and/or calculation.

device—a machine, manufacture, and/or collection thereof.

different—changed, distinct, separate, and/or not the same as.

differing—different.

direction—a spatial relation between something and a course along which it points and/or moves; a distance independent relationship between two points in space that specifies the position of either with respect to the other; and/or a relationship by which the alignment and/or orientation of any position with respect to any other position is established.

divide—to subject (a number) to the process of division.

double-section—having two identifiable, but possibly contiguous, parts during—at some time in a time interval.

each—every one of a group considered individually.

effective—sufficient to bring about, provoke, elicit, and/or cause.

elevation—a height above a point of reference.

elongate—drawn out, made spatially longer, and/or having more length than width.

embodiment—an implementation, manifestation, and/or concrete representation.

estimate—(n) a calculated value approximating an actual value; (v) to calculate and/or determine approximately and/or tentatively.

exemplary—serving as an example, instance, and/or illustration.

experience—to undergo, incur, and/or sustain.

expressed—represented by a sign, symbol, number, and/or formula.

extend—to reach spatially outward, stretch, cover, and/or span.

extending—existing, located, placed, and/or stretched lengthwise fall—(v) to drop or come down freely under the influence of gravity; (n) the act or an instance of falling.

fasten—to attach something firmly and/or fixedly to something else and/or to hold something in place.

fastener—a restraint that fastens to something and/or fastens something in place. A fastener can be a screw, bolt, hook and/or loop of a hook and loop fastener system, button, hook, catch, snap, latch, buckle, loop, tie, clamp, connector, coupler, link, band, zipper, releasable adhesive, plug and socket, and/or any other releasable mechanism for attachment, and/or a glue, bond, weld, and/or any other permanent mechanism for attachment.

first—an initial entity in an ordering of entities and/or immediately preceding the second in an ordering.

flange—a protruding rim, edge, rib, collar, tube, etc.

for—with a purpose of.

force—a capacity to do work or cause physical change.

from—used to indicate a source, origin, and/or location thereof.

further—in addition.

generate—to create, produce, give rise to, and/or bring into existence.

given—identified, specified, selected, fixed, particular, and/or previously stated.

gusset—a typically triangular bracket used to strengthen a rafter.

having—including but not limited to.

height—a measurement of the extent of something along an, often substantially vertical, dimension.

horizon—a line that defines the apparent intersection of the earth and sky as seen by an observer.

horizontal—parallel to and/or in the plane of the horizon.

including—including but not limited to.

initialize—to prepare something for use and/or some future event.

install—to connect or set in position and prepare for use.

interior—being within; inside of anything; internal; inner; further toward a center.

into—to a condition, state, or form of.

is—to exist in actuality.

joist—a beam, typically made of timber, steel, and/or or reinforced concrete, used in the construction of floors, ceilings, etc.

largest—greatest in magnitude.

less than—having a measurably smaller magnitude and/or degree as compared to something else.

lifeline—a cable or rope configured to be secured to a building to provide fall protection for individuals connected thereto by a lanyard or other connector.

load—a substantial force.

located—situated in a particular spot, region, and/or position.

may—is allowed and/or permitted to, in at least some embodiments.

measured—determined, as a dimension, quantification, and/or capacity, etc. by observation.

meet—to come into conjunction with and/or to join or touch.

method—one or more acts that are performed upon subject matter to be transformed to a different state or thing and/or are tied to a particular apparatus, said one or more acts not a fundamental principal and not preempting all uses of a fundamental principal.

more—a quantifier meaning greater in size, amount, extent, and/or degree.

near—within 12 inches of.

no—an absence of and/or lacking any.

one—being and/or amounting to a single unit, individual, and/or entire thing, item, and/or object.

opening—an aperture.

operable—practicable and/or fit, ready, and/or configured to be put into its intended use and/or service.

operatively—in a manner able to function and/or to work.

or—a conjunction used to indicate alternatives, typically appearing only before the last item in a group of alternative items.

orthogonal—perpendicular.

other—a different and/or distinct entity and/or not the same as already mentioned and/or implied.

outside—beyond a range, boundary, and/or limit; and/or not within.

oval—elliptical.

pair—a set of two items.

parallel—of, relating to, or designating lines, curves, planes, and/or or surfaces everywhere equidistant and/or an arrangement of components in an electrical circuit that splits an electrical current into two or more paths.

partially—to an extent, but not necessarily totally.

ridge—a substantially horizontally extending pointed top edge defined by a roof where two roof portions substantially intersect.

per—for each and/or by means of.

permanent—not temporary; lasting, non-reverting, and/or remaining without essential change.

perpendicular—intersecting at or forming substantially right angles; and/or substantially at aright angle with respect to an axis; and/or of, relating to, or designating two or more straight coplanar lines or planes that intersect at approximately a right angle.

pitch—a slope.

planar—shaped as a substantially flat two-dimensional surface.

plane—a substantially flat and/or two-dimensional surface and/or a surface containing all the straight lines that connect any two points on it.

plate—(n) a substantially planar body having a thickness measured perpendicular to the plane that is relatively small in comparison to the width and length of the body; (v) to coat with a thin layer of metal plurality—the state of being plural and/or more than one.

point—(n.) a defined physical and/or logical location in at least a two-dimensional system and/or an element in a geometrically described set and/or a measurement or representation of a measurement having a time coordinate and a non-time coordinate; (v.) to indicate a position and/or direction of.

portion—a part, component, section, percentage, ratio, and/or quantity that is less than a larger whole. Can be visually, physically, and/or virtually distinguishable and/or non-distinguishable.

pre-—a prefix that precedes an activity that has occurred beforehand and/or in advance.

predetermine—to determine, decide, and/or establish in advance.

prevent—to hinder, avert, and/or keep from occurring.

prior—before and/or preceding in time or order.

probability—a quantitative representation of a likelihood of an occurrence.

product—something produced by human and/or mechanical effort.
project—to calculate, estimate, or predict.
protection—the act of protecting and/or the condition of being protected.
provide—to furnish, supply, give, and/or make available.
rafter—any of a series of timbers or the like, usually having a pronounced slope for supporting the decking/sheathing and covering of a roof.
range—a measure of an extent of a set of values and/or an amount and/or extent of variation.
ratio—a relationship between two quantities expressed as a quotient of one divided by the other.
receive—to get as a signal, take, acquire, and/or obtain.
recommend—to suggest, praise, commend, and/or endorse.
reduce—to make and/or become lesser and/or smaller.
release—to let go and/or free from something that restrains, binds, fastens, and/or holds back.
remove—to eliminate, remove, and/or delete, and/or to move from a place or position occupied.
repeat—to do again and/or perform again.
repeatedly—again and again; repetitively.
request—to express a desire for and/or ask for.
result—(n.) an outcome and/or consequence of a particular action, operation, and/or course; (v.) to cause an outcome and/or consequence of a particular action, operation, and/or course.
ridge board—a long flat slab of sawed lumber located adjacent to, parallel to, and below a roof ridge.
rise—an increase in elevation.
roof—the exterior surface and its supporting structures on the top of a building.
round—being such that every part of the surface and/or the circumference is substantially equidistant from the center.
said—when used in a system or device claim, an article indicating a subsequent claim term that has been previously introduced.
second—an element that immediately follows an initial element in an ordered sequence.
select—to make a choice or selection from alternatives.
set—a related plurality.
shape—a characteristic surface, outline, and/or contour of an entity.
span—the interval, space, or distance between two points, such as the horizontal distance between the first side (of a portion of a roof) that is proximal to or defines a ridge of the roof and a second side (of that portion) that is distal from the ridge and substantially parallel to the first side.
species—a class of individuals and/or objects grouped by virtue of their common attributes and assigned a common name; a division subordinate to a genus.
static—stationary and/or constant.
steep—having a relatively sharp inclination.
store—to deposit, receive, place, collect, keep, save, hold, accumulate, and/or retain mass and/or data.
substantially—to a great extent and/or degree.
support—(v.) to hold, bear, and/or carry the weight and/or mechanical load of, especially from below; (n.) an element that bears the weight of another element of a structure and/or something that serves as a foundation, prop, brace, and/or stay.
system—a collection of mechanisms, devices, machines, articles of manufacture, processes, data, and/or instructions, the collection designed to perform one or more specific functions.
tensile—pertaining to forces on a body that tend to stretch, or elongate, the body (e.g., a rope or wire under load is subject to tensile forces).
test—(n.) an evaluation; (v.) to evaluate.
that—used as the subject or object of a relative clause.
thickness—the measure of the smallest dimension of a solid figure, that measure perpendicular to the figure's height (or length) and width.
through—across, among, between, and/or in one side and out the opposite and/or another side of.
through—across, among, between, and/or in one side and out the opposite and/or another side of.
time—a measurement of a point in a nonspatial continuum in which events occur in apparently irreversible succession from the past through the present to the future.
to—a preposition adapted for use for expressing purpose.
transform—to change in measurable: form, appearance, nature, and/or character.
treatment—an act, manner, or method of handling and/or dealing with someone and/or something.
triangular—pertaining to or having the form of a triangle; three-cornered.
truss—a prefabricated (typically wooden) structure that integrates a triangular webbing of structural members to provide support for a roof above while tying outside walls of a building together, the structural members often comprising one or more top chords (a type of rafter), ridge boards, webs, bottom chords (tie beams), posts, purlins, struts, braces, joints, gussets, nailplates, and/or connection plates.
two—a cardinal number equal to one plus one.
undergoes—to experience, endure, and/or sustain.
upon—immediately or very soon after; and/or on the occasion of.
use—to put into service.
vertical—substantially perpendicular to horizontal.
via—by way of and/or utilizing.
visible—viewable by a user.
weight—a force with which a body is attracted to Earth or another celestial body, equal to the product of the object's mass and the acceleration of gravity; and/or a factor and/or value assigned to a number in a computation, such as in determining an average, to make the number's effect on the computation reflect its importance, significance, preference, impact, etc.
when—at a time and/or during the time at which.
wherein—in regard to which; and; and/or in addition to.
which—what particular one or ones of; and/or a pronoun adapted to be used in clauses to represent a specified antecedent.
width—a measurement of the extent of something along an, often substantially horizontal, dimension.
with—accompanied by.
with regard to—about, regarding, relative to, and/or in relation to.
with respect to—about, regarding, relative to, and/or in relation to.
within—inside the limits of.
zone—an area, region, and/or volume that is distinguished from adjacent parts by a distinctive boundary, feature, and/or characteristic.

NOTE

Various substantially and specifically practical and useful exemplary embodiments of the claimed subject matter are described herein, textually and/or graphically, including the best mode, if any, known to the inventor(s), for implementing the claimed subject matter by persons having ordinary skill in the art. References herein to "in one embodiment", "in an embodiment", or the like do not necessarily refer to the same embodiment.

Any of numerous possible variations (e.g., modifications, augmentations, embellishments, refinements, and/or enhancements, etc.), details (e.g., species, aspects, nuances, and/or elaborations, etc.), and/or equivalents (e.g., substitutions, replacements, combinations, and/or alternatives, etc.) of one or more embodiments described herein might become apparent upon reading this document to a person having ordinary skill in the art, relying upon his/her expertise and/or knowledge of the entirety of the art and without exercising undue experimentation. The inventor(s) expects any person having ordinary skill in the art, after obtaining authorization from the inventor(s), to implement such variations, details, and/or equivalents as appropriate, and the inventor(s) therefore intends for the claimed subject matter to be practiced other than as specifically described herein. Accordingly, as permitted by law, the claimed subject matter includes and covers all variations, details, and equivalents of that claimed subject matter. Moreover, as permitted by law, every combination of the herein described characteristics, functions, activities, substances, and/or structural elements, and all possible variations, details, and equivalents thereof, is encompassed by the claimed subject matter unless otherwise clearly indicated herein, clearly and specifically disclaimed, or otherwise clearly unsuitable, inoperable, or contradicted by context.

The use of any and all examples, or exemplary language (e.g., "such as") provided herein, is intended merely to better illuminate one or more embodiments and does not pose a limitation on the scope of any claimed subject matter unless otherwise stated. No language herein should be construed as indicating any non-claimed subject matter as essential to the practice of the claimed subject matter.

Thus, regardless of the content of any portion (e.g., title, field, background, summary, description, abstract, drawing figure, etc.) of this document, unless clearly specified to the contrary, such as via explicit definition, assertion, or argument, or clearly contradicted by context, with respect to any claim, whether of this document and/or any claim of any document claiming priority hereto, and whether originally presented or otherwise:

- there is no requirement for the inclusion of any particular described characteristic, function, activity, substance, or structural element, for any particular sequence of activities, for any particular combination of substances, or for any particular interrelationship of elements;
- no described characteristic, function, activity, substance, or structural element is "essential"; and
- within, among, and between any described embodiments:
  - any two or more described substances can be mixed, combined, reacted, separated, and/or segregated;
  - any described characteristic, function, activity, substance, component, and/or structural element, or any combination thereof, can be specifically included, duplicated, excluded, combined, reordered, reconfigured, integrated, and/or segregated;
  - any described interrelationship, sequence, and/or dependence between any described characteristics, functions, activities, substances, components, and/or structural elements can be omitted, changed, varied, and/or reordered;
  - any described activity can be performed manually, semi-automatically, and/or automatically;
  - any described activity can be repeated, performed by multiple entities, and/or performed in multiple jurisdictions.

The use of the terms "a", "an", "said", "the", and/or similar referents in the context of describing various embodiments (especially in the context of the following claims) are to be construed to cover both the singular and the plural, unless otherwise indicated herein or clearly contradicted by context.

The terms "comprising," "having," "including," and "containing" are to be construed as open-ended terms (i.e., meaning "including, but not limited to,") unless otherwise noted.

When any number or range is described herein, unless clearly stated otherwise, that number or range is approximate. Recitation of ranges of values herein are merely intended to serve as a shorthand method of referring individually to each separate value falling within the range, unless otherwise indicated herein, and each separate value and each separate sub-range defined by such separate values is incorporated into the specification as if it were individually recited herein. For example, if a range of 1 to 10 is described, that range includes all values therebetween, such as for example, 1.1, 2.5, 3.335, 5, 6.179, 8.9999, etc., and includes all sub-ranges therebetween, such as for example, 1 to 3.65, 2.8 to 7.14, 1.93 to 9, etc., even if those specific values or specific sub-ranges are not explicitly stated.

When any phrase (i.e., one or more words) appearing in a claim is followed by a drawing element number, that drawing element number is exemplary and non-limiting on claim scope.

No claim or claim element of this document is intended to invoke 35 USC 112 (f) unless the precise phrase "means for" is followed by a gerund.

Any information in any material (e.g., a United States patent, United States patent application, book, article, web page, etc.) that has been incorporated by reference herein, is incorporated by reference herein in its entirety to its fullest enabling extent permitted by law yet only to the extent that no conflict exists between such information and the other definitions, statements, and/or drawings set forth herein. In the event of such conflict, including a conflict that would render invalid any claim herein or seeking priority hereto, then any such conflicting information in such material is specifically not incorporated by reference herein. Any specific information in any portion of any material that has been incorporated by reference herein that identifies, criticizes, or compares to any prior art is not incorporated by reference herein.

Applicant intends that each claim presented herein and at any point during the prosecution of this application, and in any application that claims priority hereto, defines a distinct patentable invention and that the scope of that invention must change commensurately if and as the scope of that claim changes during its prosecution. Thus, within this document, and during prosecution of any patent application related hereto, any reference to any claimed subject matter is intended to reference the precise language of the then-pending claimed subject matter at that particular point in time only.

Accordingly, every portion (e.g., title, field, background, summary, description, abstract, drawing figure, etc.) of this document, other than the claims themselves and any provided definitions of the phrases used therein, is to be regarded as illustrative in nature, and not as restrictive. The scope of subject matter protected by any claim of any patent that issues based on this document is defined and limited only by the precise language of that claim (and all legal equivalents thereof) and any provided definition of any phrase used in that claim, as informed by the context of this document when reasonably interpreted by a person having ordinary skill in the relevant art.

What is claimed is:

1. A fall protection anchor system for a double-section steep pitch roof, the roof defining two substantially planar steep pitch roof portions that meet at a ridge of the roof, the ridge extending perpendicular to a rafter that partially supports one or more of the roof portions, each roof portion defined by a roof pitch expressed as a ratio of a vertical rise divided by a horizontal span of that roof portion, the roof pitch ranging between 4:12 and 20:12, the anchor system comprising:

an elongate anchor bar that defines an anchor point aperture extending through the anchor bar to define an anchor point operatively located above the ridge;

a pair of anchor brackets, each anchor bracket:

comprises a plate that defines a plurality of plate flanges, each plate flange extending in a corresponding plate flange plane, each plate flange plane substantially orthogonal to a plane defined by the plate, a first plate flange of the plurality of plate flanges operatively extending substantially vertically, a second plate flange of the plurality of plate flanges operatively extending substantially horizontally;

defines a plurality of bracket plate apertures extending through its plate;

defines a plurality of bracket flange apertures extending through one or more of its flanges;

operatively attaches to a roof support via a plurality of fasteners that extend through the plurality of bracket plate apertures, the roof support comprising the rafter or a gusset, blocking, or bracing attached to the rafter; and operatively attaches to the anchor bar;

wherein:

the first plate flange of a first anchor bracket of the pair of anchor brackets and the first plate flange of a second anchor bracket of the pair of anchor brackets operatively fasten to each other and to the anchor bar;

the anchor system operatively fastens the anchor bar at any of a plurality of elevations with respect to the anchor brackets after each anchor bracket is operatively attached to its roof support;

the anchor bar operatively defines a vertically extending anchor bar height, an anchor bar width that is orthogonal to the anchor bar height, and an anchor bar thickness that is orthogonal to the anchor bar height and the anchor bar width, the anchor bar width defining a plane that is operatively substantially parallel to a plane defined by the ridge of the roof;

the anchor bar operatively extends, through an opening in the roof, from an interior attic zone covered by the roof to above the ridge of the roof; and the anchor bar is configured to operatively connect to a fall protection system at the anchor point.

2. The anchor system of claim 1, wherein:

when the anchor system undergoes a load test during which the anchor system operatively supports a 3000-pound static tensile force applied, to the anchor bar at the anchor point, in any direction for 5 minutes before being released, the roof support experiences no damage and the anchor bar experiences no permanent deformation.

3. The anchor system of claim 1, wherein:

when the anchor system undergoes a load test during which the anchor system operatively supports a 3000-pound static tensile force applied, to the anchor bar at the anchor point, in any direction for 5 minutes before being released, the roof support experiences no damage, the anchor bar experiences no permanent deformation, and, during the load test, the anchor bar experiences a deflection ratio of less than 0.5, the deflection ratio defined by the largest horizontally measured deflection of the anchor bar at the anchor point at any time during the load test divided by the anchor bar thickness at the anchor point.

4. The anchor system of claim 1, wherein:

the first plate flange of the first anchor bracket of the pair of anchor brackets operatively attaches to a ridge board of the roof.

5. The anchor system of claim 1, wherein:

the second plate flange of the first anchor bracket of the pair of anchor brackets operatively attaches to an elongate support member that longitudinally extends parallel to the ridge and connects the rafter to an adjacent rafter.

6. The anchor system of claim 1, wherein:

the plate defines, at least in part, a substantially right triangular shape, the shape comprising a operatively substantially vertically extending side and an operatively substantially horizontally extending side, a ratio of a length of the operatively substantially vertically extending side to a length of the operatively substantially horizontally extending side ranging from 0.333 to 1.67.

7. The anchor system of claim 1, wherein:

for each anchor bracket, the plate defines a pitch of that anchor bracket, the pitch of the anchor bracket operatively differing from the roof pitch.

8. The anchor system of claim 1, wherein:

each anchor bracket and each of its plurality of fasteners is operatively visible from an interior attic zone covered by the roof.

9. The anchor system of claim 1, wherein:

the anchor point aperture has a round and/or oval cross-sectional shape.

10. The anchor system of claim 1, further comprising:

the fall protection system, the fall protection system comprising a lifeline and a connector that operatively connects the lifeline to the anchor bar at the anchor point.

* * * * *